(12) United States Patent
Kim et al.

(10) Patent No.: US 11,295,057 B1
(45) Date of Patent: Apr. 5, 2022

(54) CONTINUOUS AND DISCRETE CORNER REGULARIZATION IN MULTI-PVT TIMING PREDICTION

(71) Applicant: Apex Semiconductor, San Jose, CA (US)

(72) Inventors: Minkyu Kim, San Jose, CA (US); Alfred Yeung, San Jose, CA (US); Pingchun Chiang, San Jose, CA (US); Suresh Subramaniam, San Jose, CA (US); Pravin Chingudi, Karnataka (IN)

(73) Assignee: Apex Semiconductor, San Jose, CA (US)

(*) Notice: Subject to any disclaimer, the term of this patent is extended or adjusted under 35 U.S.C. 154(b) by 0 days.

(21) Appl. No.: 17/172,200

(22) Filed: Feb. 10, 2021

(51) Int. Cl.
*G06F 30/398* (2020.01)
*G06F 111/20* (2020.01)
*G06F 119/02* (2020.01)

(52) U.S. Cl.
CPC ........ *G06F 30/398* (2020.01); *G06F 2111/20* (2020.01); *G06F 2119/02* (2020.01)

(58) Field of Classification Search
CPC .................................................. G06F 30/398
USPC ........................................................ 716/111
See application file for complete search history.

(56) References Cited

U.S. PATENT DOCUMENTS

| | | | |
|---|---|---|---|
| 8,271,921 B2 | 9/2012 | Nitta et al. | |
| 8,494,670 B2 | 7/2013 | McConaghy et al. | |
| 8,604,826 B2 | 12/2013 | Cho et al. | |
| 8,863,052 B1 | 10/2014 | Dhuria et al. | |
| 9,633,150 B2 | 4/2017 | Barker | |
| 9,798,846 B2 | 10/2017 | Rajagopalan et al. | |
| 10,108,770 B2 | 10/2018 | Rajagopalan et al. | |
| 10,318,676 B2 | 6/2019 | Yeung et al. | |
| 10,318,696 B1 | 6/2019 | Yeung et al. | |
| 2013/0117721 A1* | 5/2013 | Mcconaghy | G06F 30/367 716/106 |
| 2018/0173822 A1* | 6/2018 | Zhu | G06F 30/20 |

* cited by examiner

*Primary Examiner* — Eric D Lee
(74) *Attorney, Agent, or Firm* — Amin, Turocy & Watson, LLP

(57) ABSTRACT

A corner prediction system applies data generated through discrete process, voltage, and temperature (PVT) corner prediction to achieve highly accurate continuous corner prediction coverage. Embodiments of the corner prediction system can be trained to generate accurate performance metric prediction for a continuous range of PVT corners within a design space given a set of available pre-trained PVT corners. The corner prediction system can address the need to provide accurate continuous timing prediction coverage of design operating conditions (represented by PVT corners) through the availability of discrete PVT corners.

20 Claims, 14 Drawing Sheets

CONTINUOUS AND DISCRETE CORNER REGULARIZATION IN MULTI-PVT TIMING PREDICTION

TECHNICAL FIELD

The subject disclosure relates generally to integrated circuit (IC) design and testing.

BACKGROUND

The performance of some integrated circuits (ICs) or very large scale integration (VLSI) systems, in terms of circuit timing or other performance parameters, is sensitive to variations in process (device and interconnect process), voltage, and temperature. To ensure that a given semiconductor design will operate within acceptable tolerances under anticipated process, voltage, and temperature (PVT) conditions, designers often simulate performance of the design under different operating conditions, represented by multi-dimensional PVT corners, in order to predict the performance of the IC design under those conditions. However, since the number of trained PVT corners is typically finite, performance prediction based on PVT corner analysis is necessarily discrete in nature. This limits the predictive coverage and accuracy of PVT corner analysis.

The above-described description is merely intended to provide a contextual overview of current techniques and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In one or more embodiments, a system for predicting performance of an integrated circuit is provided, comprising a memory that stores executable components and trained corner data defining performance metric values for an integrated circuit design under respective different operating conditions corresponding to discrete process, voltage, and temperature (PVT) corners; a corner selection component configured to select a subset of the discrete PVT corners that satisfy a distance-based selection criterion relative to a target corner representing a target operating condition, wherein the distance-based selection criterion is defined by a selection algorithm; a target corner prediction component configured to generate, based on a prediction algorithm, a predicted performance metric value for the integrated circuit design under the target operating condition based on respective distances of the subset of the discrete PVT corners from the target corner and a subset of the performance metric values associated with the subset of the discrete PVT corners; and a validation component configured to modify at least one of the selection algorithm or the prediction algorithm based on a difference between the predicted performance metric value and a reference performance metric value for the target corner to yield modified algorithms.

Also, according to one or more embodiments, a method for predicting a performance metric of an integrated circuit is provided, comprising identifying, by a system comprising a processor, a subset of trained process, temperature, and voltage (PVT) corners whose dimensional distances from a target corner satisfy a defined selection criterion, wherein the target corner represents a target operating condition for an integrated circuit; generating, by the system based on a prediction algorithm, a predicted performance metric value for the integrated circuit under the target operating condition based on respective dimensional distances of the subset of the trained PVT corners from the target corner and performance metric values associated with the subset of the trained PVT corners; and modifying, by the system based on a difference between the predicted performance metric value and a reference performance metric value for the target corner, at least one of the defined selection criterion or the prediction algorithm.

In addition, a non-transitory computer-readable medium is provided having stored thereon instructions that, in response to execution, cause a system comprising a processor to perform operations, the operations comprising selecting a subset of trained process, temperature, and voltage (PVT) corners that satisfy a distance-based selection criterion relative to a target corner representing a target operating condition for an integrated circuit, wherein the distance-based selection criterion is defined by a selection algorithm; generating, based on a prediction algorithm, a predicted performance metric value for the integrated circuit under the target operating condition based on respective dimensional distances of the subset of the trained PVT corners from the target corner and performance metric values associated with the subset of the trained PVT corners; and modifying, based on a difference between the predicted performance metric value and a reference performance metric value for the target corner, at least one of the selection algorithm or the prediction algorithm.

DETAILED DESCRIPTION

Figure 1:
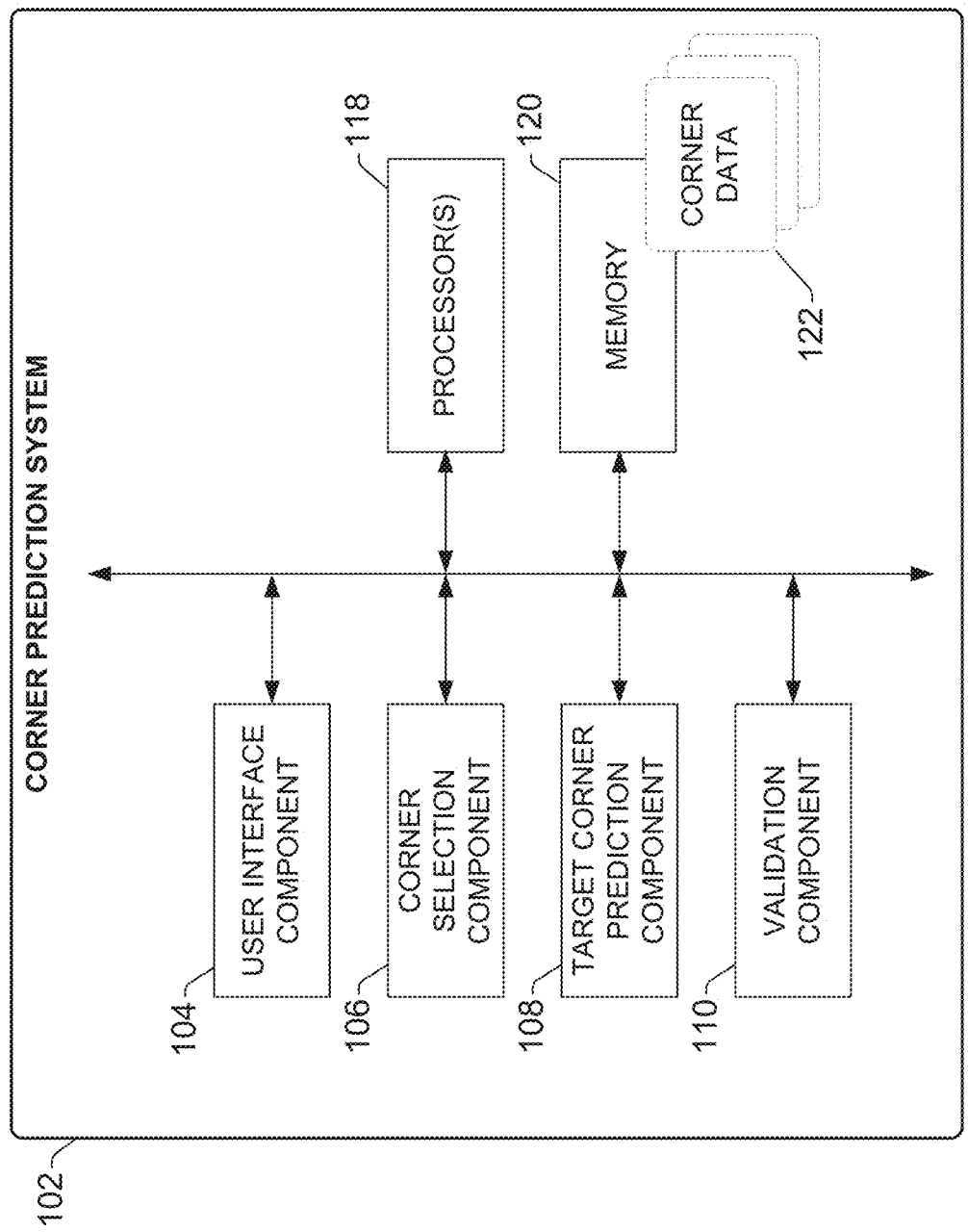
FIG. 1 is a block diagram of an example corner prediction system.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

One or more embodiments described herein provide a corner prediction system that applies data generated through discrete corner prediction to achieve highly accurate continuous corner prediction coverage. In conventional PVT corner prediction approaches, there is no formal method to provide continuous corner coverage based on trained corners. Instead, performance predictions for a given corner are typically obtained only by directly generating prediction results at that particular corner, or by selecting a pre-trained PVT corner that is similar to the corner being tested (the target corner) and applying a large error margin to account for differences between the trained corner and the target corner. By contrast, embodiments of the corner prediction system described herein can be trained to generate accurate performance metric predictions for a continuous range of PVT corners within a design space given a finite set of available pre-trained PVT corners. The corner prediction system described herein can address the need to provide accurate continuous timing prediction coverage of design operating conditions (represented by PVT corners) through the availability of discrete PVT corners.

FIG. 1 is a block diagram of an example corner prediction system 102 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Corner prediction system 102 can include a user interface component 104, a corner selection component 106, a target corner prediction component 108, a validation component 110, a user interface component 112, one or more processors 118, and memory 120. In various embodiments, one or more of the user interface component 104, corner selection component 106, target corner prediction component 108, validation component 110, the one or more processors 118, and memory 120 can be electrically and/or communicatively coupled to one another to perform one or more of the functions of the corner prediction system 102. In some embodiments, components 104, 106, 108, and 110 can comprise software instructions stored on memory 120 and executed by processor(s) 118. Corner prediction system 102 may also interact with other hardware and/or software components not depicted in FIG. 1. For example, processor(s) 118 may interact with one or more external user interface devices, such as a keyboard, a mouse, a display monitor, a touchscreen, or other such interface devices.

User interface component 104 can be configured to receive input data for submission to the system 102 and to render output data generated by the system 102. Example input data that can be submitted to the system 102 can include, for example, information specifying the dimensions of a target corner for which a performance prediction is to be generated. Example output data that can be rendered by the user interface component 104 can include, for example, performance metric predictions (e.g., predictions regarding circuit timing, power consumption, or other performance metrics) generated for the target corner by the system 102.

Corner selection component 106 can be configured to identify a subset of available trained PVT corners that satisfy a distance metric relative to the dimensions of the target corner. The target corner prediction component 108 can be configured to generate a performance prediction for the target corner based on available corner data 122 for the selected trained PVT corners and a regularization algorithm that applies the available corner data 122 to the target corner based on the relative locations of the target corner and the selected trained corners within the space of PVT corner dimensions. The validation component 110 can be configured to determine an accuracy of the predicted performance metric for the target corner based on comparison with reference data for the target corner and, based on a result of this validation check, update one or both of the distance metric used to select the trained PVT corners or the regularization algorithm used to apply the selected corner data to the trained corner.

The one or more processors 118 can perform one or more of the functions described herein with reference to the systems and/or methods disclosed. Memory 120 can be a computer-readable storage medium storing computer-executable instructions and/or information for performing the functions described herein with reference to the systems and/or methods disclosed.

Figure 2:
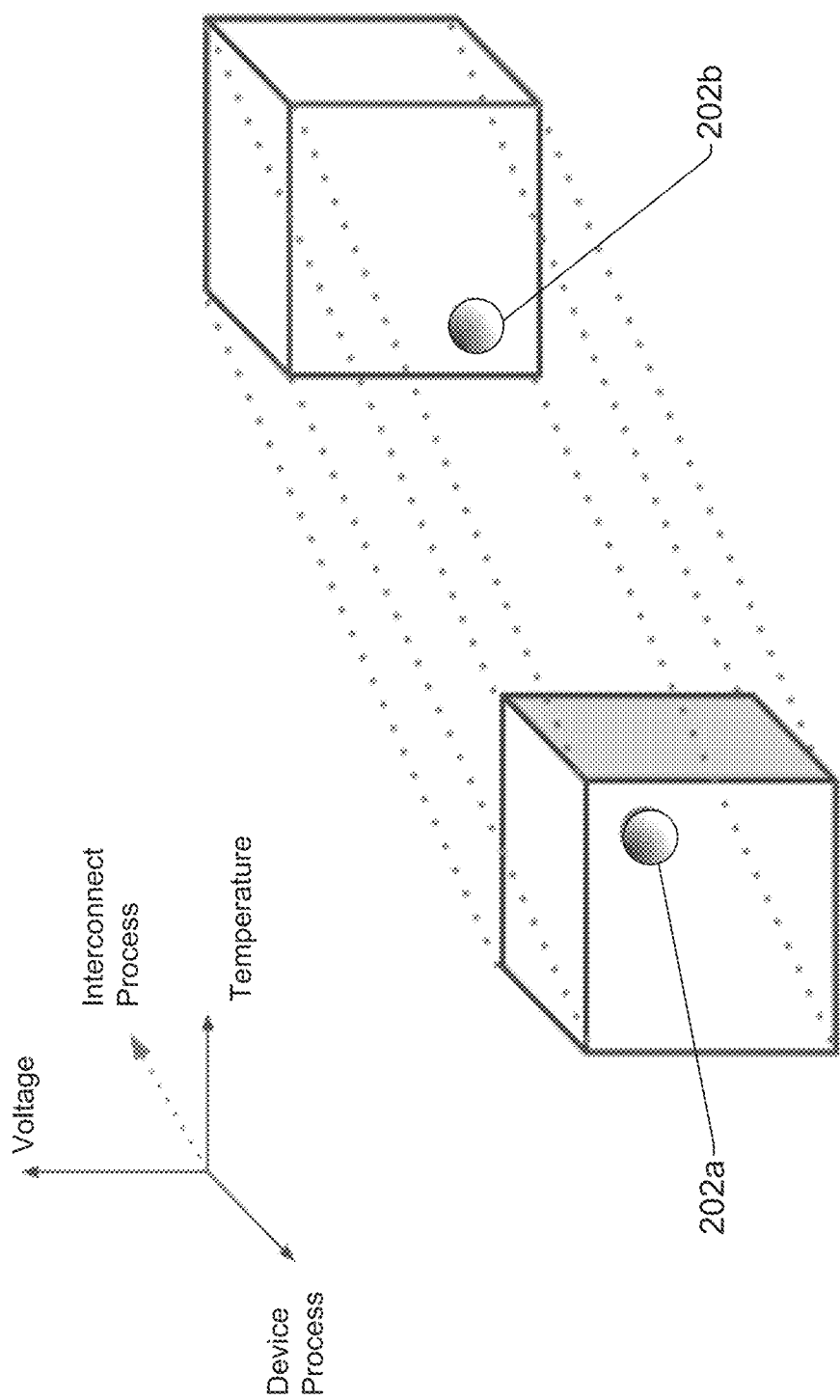
FIG. 2 is a conceptual diagram illustrating two example four-dimensional PVT corners within a corner space.

In general, a PVT corner is defined by different facets that describe the operating condition represented by the corner. FIG. 2 is a conceptual diagram illustrating two example four-dimensional PVT corners 202a and 202b within a corner space. The dimensions that make up a PVT corner definition can vary between process technologies, but always comprise dimensions of independent variance. In the examples described herein, the dimensions of a PVT corner comprise device process, interconnect process, voltage, and temperature. The location of each PVT corner 202 illustrated in FIG. 2 within the three-dimensional cube represents the values of three of the dimensions (voltage, device process, and temperature), while the location of the cube itself along the projection lines represents the value of the fourth dimension (interconnect process). As can be seen in FIG. 2, the two PVT corners 102a and 202b have different values for each of the four dimensions, and as such occupy different locations within the four-dimensional space.

Figure 3:
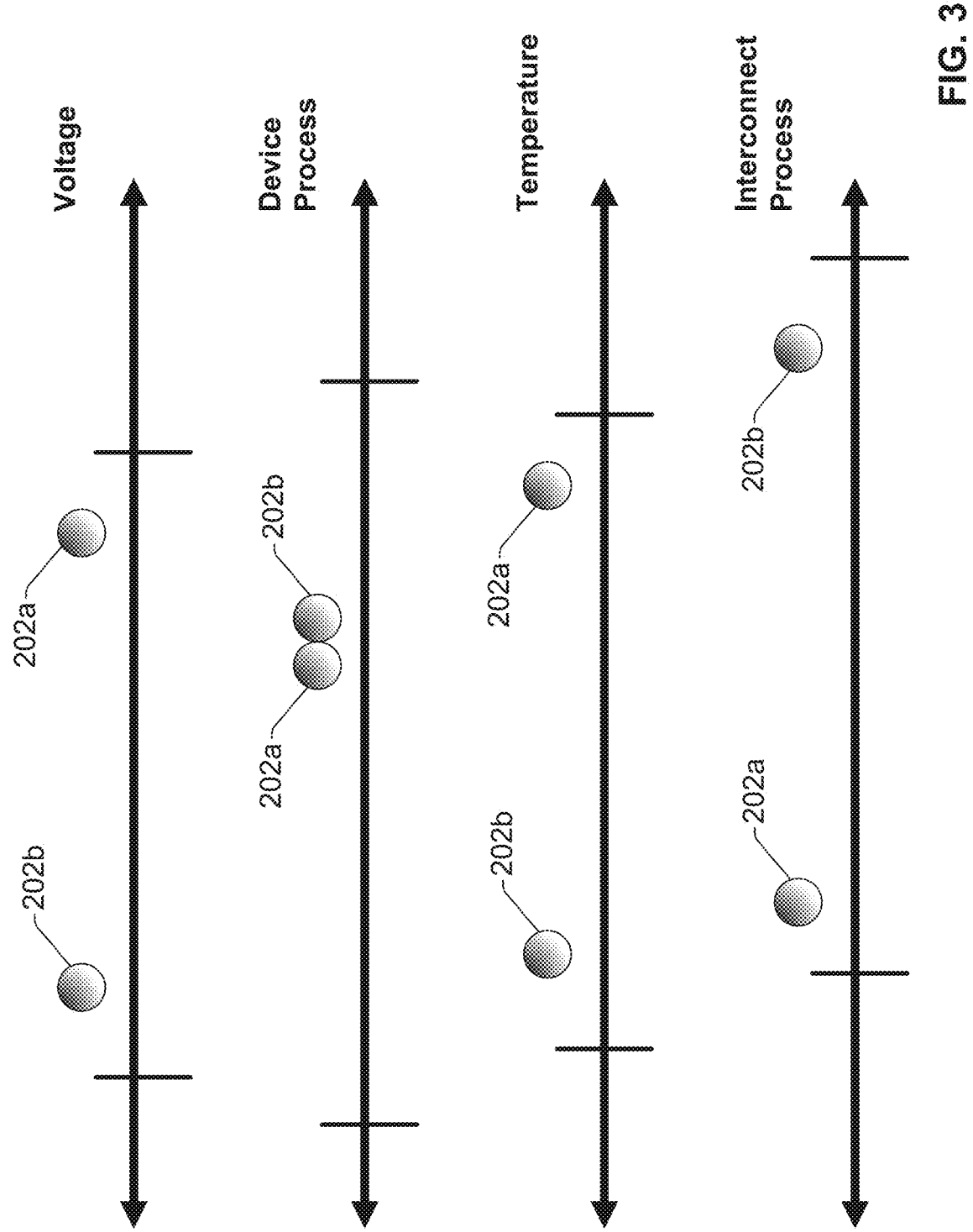
FIG. 3 is a set of four single-dimension axes corresponding to the four dimensions of the PVT corners, with two example PVT corners plotted on each axis.

For illustrative purposes, the PVT corners can be decomposed into their four independent dimensions. FIG. 3 is a set of four single-dimension axes corresponding to the four dimensions of the PVT corners, with the two example PVT corners 202a and 202b plotted on each axis. PVT corners 202a and 202b represent two trained corners for which performance metric data, such as circuit timing, is known and available. In general, an IC or semiconductor design will exhibit different timing behavior at each of these corners 202. The corners 202a and 202b are assumed to be pre-trained corners, and as such accurate timing data is available for both corners 202a and 202b. The pre-trained timing data associated with each corner 202a and 202b represents the circuit timing that can be expected when operating under the conditions represented by the respective corners 202.

Figure 4:
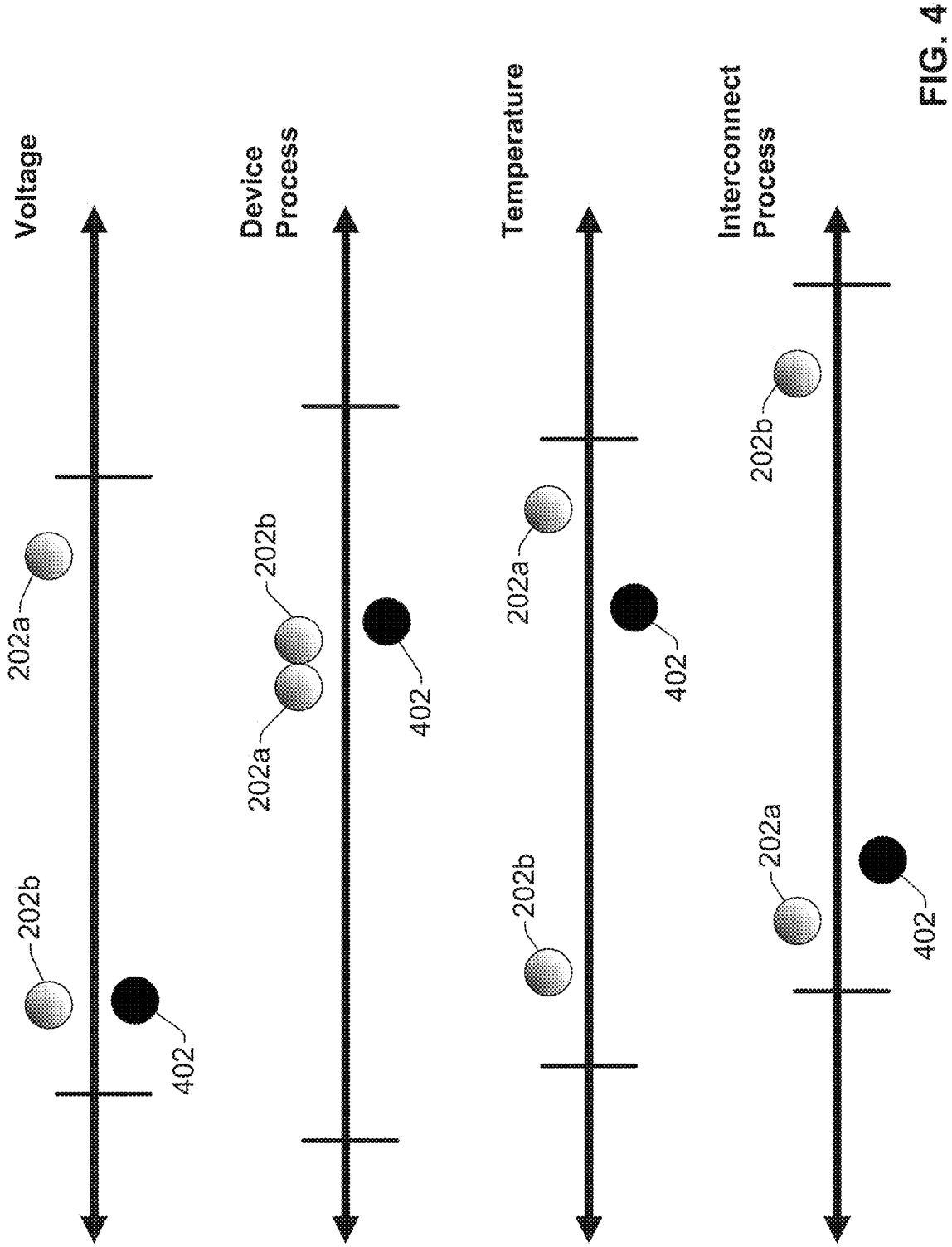
FIG. 4 is the set of four single-dimension axes with an example target corner plotted together with two example trained corners.

Given a set of finite, discrete trained corners 202, a designer may wish to predict the timing (or another performance metric) of an IC design at another corner—referred to as a target corner—that does not correspond to one of the trained corners 202. FIG. 4 is the set of four single-dimension axes with an example target corner 402 plotted together with the two example trained corners 202a and 202b. The operating condition represented by target corner 402 has a relationship with the two trained PVT corners 202a and 202b, but this relationship is difficult to define mathematically since each dimension is likely to have a different effect on the timing. The relationship becomes even more difficult to quantify when a greater number of discrete trained corners 202 are available for analysis relative to the target corner 402.

Embodiments of the corner prediction system 102 described herein can address these and other issues by obtaining a reduced set of available trained PVT corners 202 that can be used to accurately predict the performance of a given target corner 402, generating performance prediction results for the target corner 402 from this reduced set of PVT corners 202 based on a presumed mathematical relationship between the target corner 402 and the selected PVT corners 202, validating this result using reference data for the target corner 402, and refining the mathematical relationship based on a result of this validation. The system 102 can iterate this process multiple times if necessary, with the validation step gradually optimizing the mathematical relationship used to project the discrete PVT corners 202 to the target corner 402 for generation of a performance prediction (e.g., a timing prediction). In some embodiments, the results of the validation step can also be used to refine the criteria used to select the relevant subset of available trained PVT corners 202. Using the resulting refined or optimized mathematical algorithms, the system 102 can then generate accurate performance predictions for substantially any target corner 402 located within the continuous space between available PVT corners 202.

Figure 5:
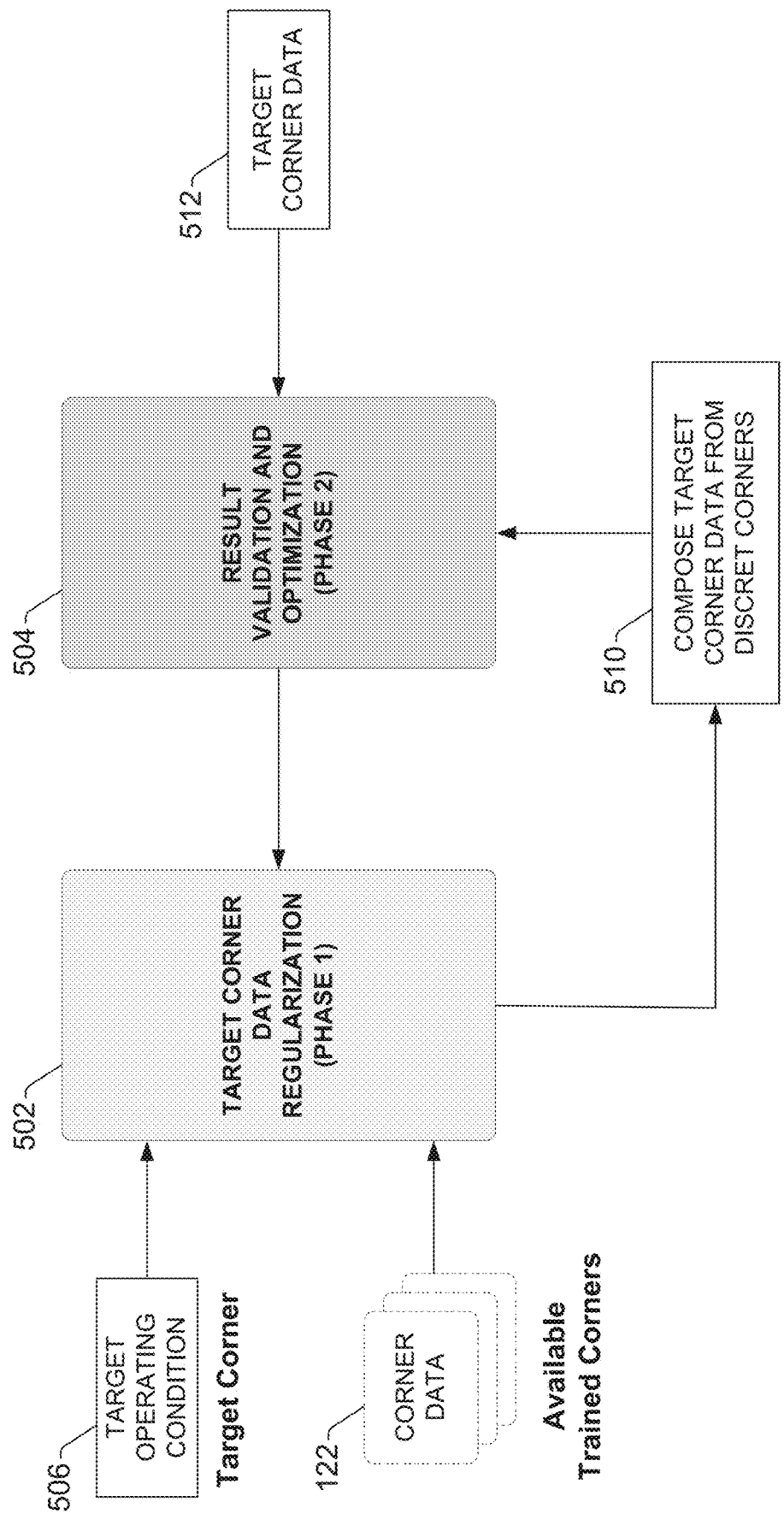
FIG. 5 is a diagram illustrating two general phases for generating performance predictions for a target corner.

The corner prediction system 102 carries out two general phases for generating performance predictions for a target corner 402. FIG. 5 is a diagram illustrating these phases. First, a regularization phase 502 is performed whereby a subset of the total available trained PVT corners 202 (represented by trained corner data 122) is selected according to a distance metric relative to the target corner 402 being analyzed, and a performance metric prediction (e.g., a timing prediction, a power consumption prediction, etc.) is generated at block 510 for the target operating condition 506 (the target corner) based on an application of this subset of PVT corners 202 to the target corner 402. Then, during a validation phase 504, the prediction result is compared with reference target corner data 512, and the algorithms used to perform the regularization phase 502 are refined based on the results of this comparison. This can include refining one or both of the algorithm used to select the subset of trained PVT corners 202 or the algorithm used to translate the selected PVT corners 202 to a performance prediction for the target corner 402.

Figure 6:
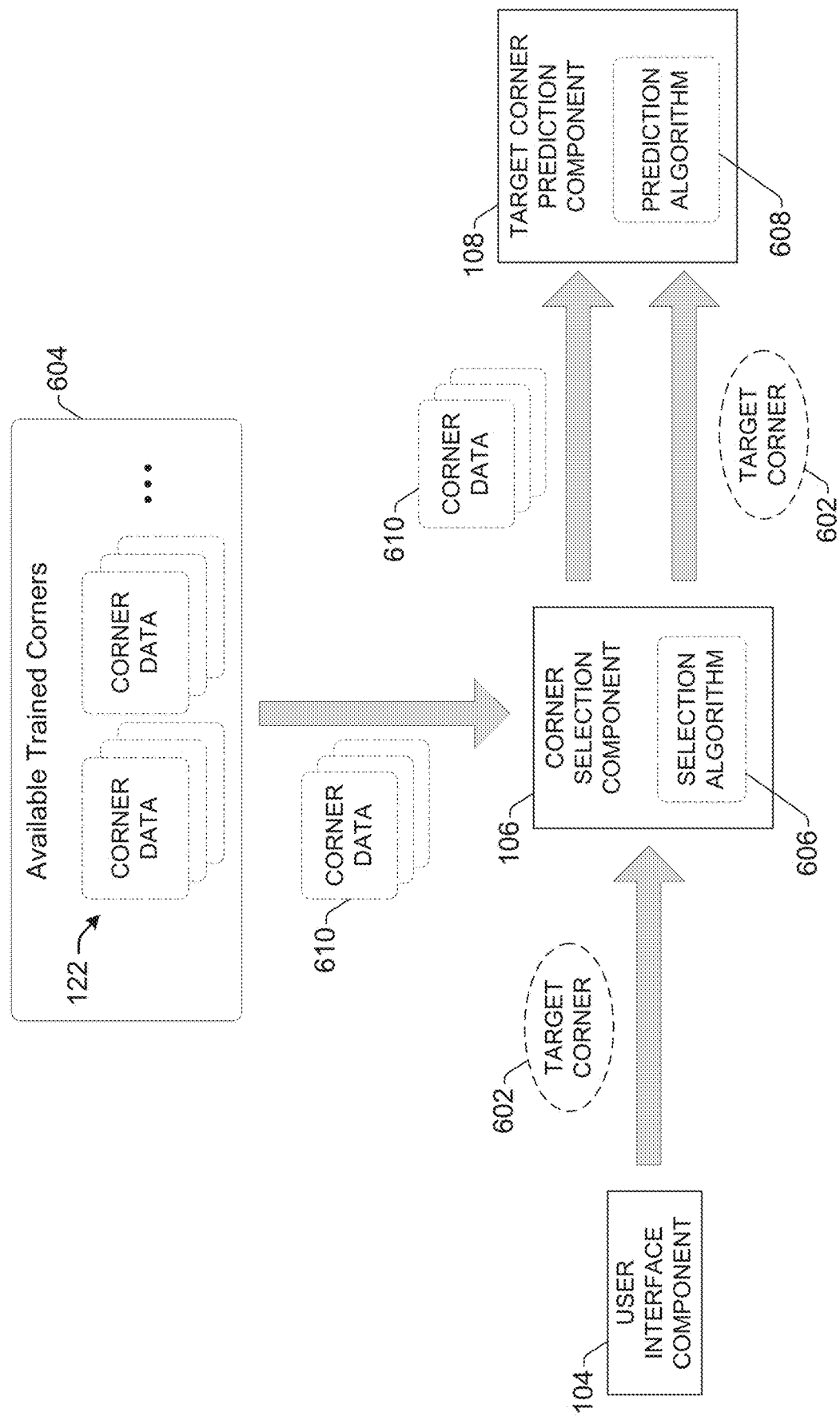
FIG. 6 is a diagram illustrating selection of PVT corners to be used to generate performance predictions for a target corner in accordance with a regularization phase.

FIG. 6 is a diagram illustrating selection of PVT corners to be used to generate performance predictions for a target corner by embodiments of system 102, in accordance with the regularization phase 502 described above. The system 102 maintains a PVT corner library 604 that stores trained PVT corner data 122 representing known performance metric data for each of a finite set of discrete PVT corners (e.g., corners 202). For each trained PVT corner (e.g., trained corners 202 in FIGS. 2-4), the PVT corner data 122 can define the value of one or more performance metrics (e.g., circuit switch timing, power consumption, etc.) that can be expected of a circuit design under operating conditions represented by the dimensional values of that corner 202. In some scenarios, these trained PVT corners 202 may represent extreme conditions under which a semiconductor design could conceivably be operated, together with some intermediate operating conditions for additional coverage. Given this set of known corner data 122, system 102 applies the methodology described above in connection with FIG. 5 to accurately predict a value of a performance metric at any given target corner 402 within the continuous space between the discrete trained corners 202.

Initially, target corner data 602 representing a target corner 402 for which a performance metric is to be estimated is submitted to the system 102 via user interface component 104. The target corner data 602 can specify the values of the target corner's dimensions (e.g., device process, interconnect process, voltage, and temperature), and can be submitted manually via interaction with a user interface generated by the user interface component 104 and rendered on a client device. Alternatively, the target corner data 602 can be generated and submitted to the system 102 by another semiconductor design or simulation system as part of a design and testing phase for an IC being developed.

The target corner data 602 is submitted to the corner selection component 106, which decomposes the target corner data 602 into its independent dimensions. Based on a comparison between each of these independent target corner dimensions and the corresponding dimensions of the available trained PVT corners 202, as represented by corner data 122, the corner selection component 106 identifies a subset of the trained PVT corners 202 that satisfy selection criteria relative to the target corner data 602. This selection criteria can be defined by a selection algorithm 606 that is used by the corner selection component 106 to reduce the total set of available corner data 122 to a reduced set of corner data 610 that will be subsequently be used to estimate the performance at the target corner 402.

The corner selection component 106 can select the subset of available PVT corners 202 based on their distances from the target corner 402 along one or more of the corner dimensions. To this end, the corner selection component 106, in accordance with the selection algorithm 606, can perform a distance analysis that compares the value of each dimension of the target corner with its corresponding dimension of each of the available trained corners 202. The single-axis plots depicted in FIG. 4 illustrate this distance analysis. For each of the four corner dimensions in this example, the value of the dimension for the target corner 402 can be compared with the values of the same dimension for the available trained PVT corners 202. Although only two such trained corners 202 are depicted in FIG. 4 for clarity, there may be any number of available corners 202 maintained by system 102 from which the corner selection component 106 can select a suitable subset.

In general, the selection algorithm 606 seeks to identify a subset of the available corners 202 having dimensions that are most similar to those of the target corner 402, and will select those corners 202 for subsequent target corner prediction. This will reduce the processing overhead associated with generating the target corner performance prediction by reducing the number of trained corners 202 that will be projected to the target corner 402 during that step.

Figure 7:
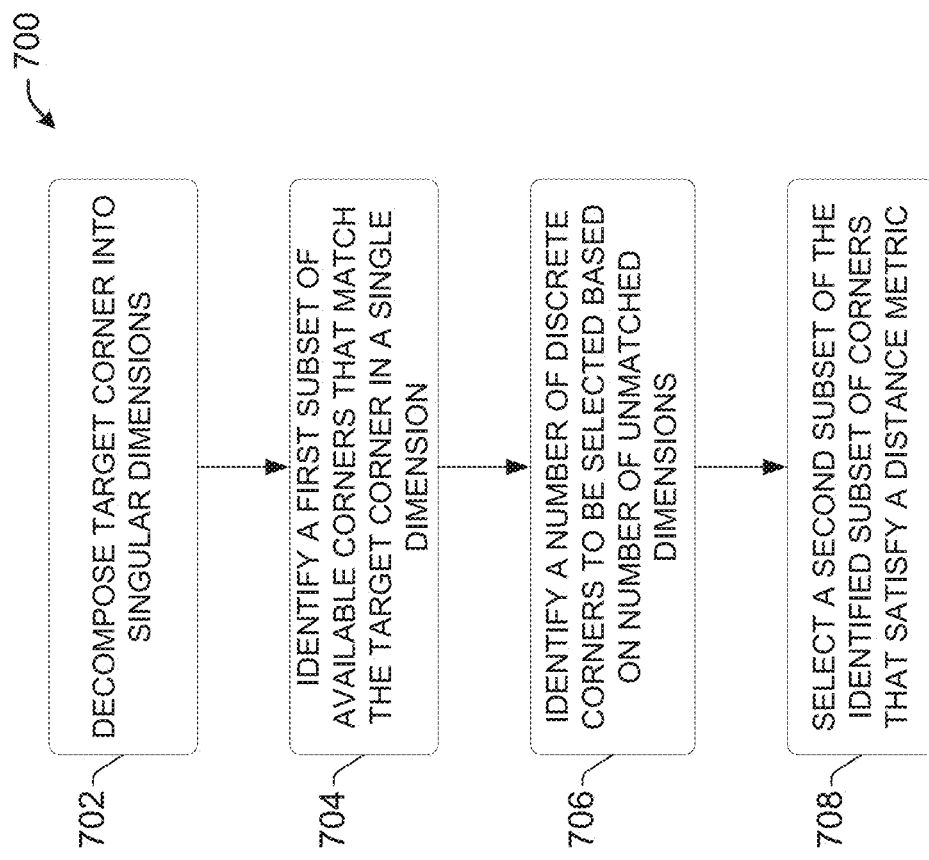
FIG. 7 a flowchart of an example corner selection process that can be carried out a corner prediction system.

FIG. 7 is a flowchart of an example corner selection process 700 that can be carried out by the corner selection component 106 in some embodiments. Initially, at 702, the target corner data 602 is decomposed into singular dimensions, as noted above. Then, at step 704, based on comparisons between each individual dimension of the target corner 402 and the corresponding dimensions of the discrete trained corners 202 (as defined in corner data 122), the selection algorithm 606 can identify a first subset of the available corners 202 having values of a dimension that cluster closely to the corresponding dimension of the target corner 402 (e.g., within a defined tolerance, which may be defined independently for each dimension in some embodiments). This comparative analysis can be performed for each of the corner dimensions so that, for each dimension, a determination is made as to whether any of the trained PVT corners 202 have a value of the dimension that matches, or substantially matches according to a defined tolerance range, the target corner's value for that dimension. These matching corners are selected for subsequent steps.

This first subset of available corners 202 identified at step 704 can be categorized according to the number of dimensions that are identically matched, or nearly identically matched, between the target corner 402 and the selected trained corners 202. For example, some of the trained corners 202 selected at step 704 may match the target corner 402 in only one dimension, with the values of the other dimensions deviating from the corresponding values of the target corner 402 to varying degrees. Other trained corners 202 may match the target corner 402 in two or three dimensions, with the remaining dimension(s) deviating from the target corner 402.

Next, at step 706, the corner selection component 106 identifies a number of unmatched dimensions, or dimensions of the target corner 402 whose values do not match those of the corresponding dimension of any of the available trained corners 202. In some embodiments, this number of unmatched dimensions can determine the number of available trained corners 202 that will be selected by the corner selection component 106. At 708, the first subset of available PVT corners 202 selected at step 704 is further reduced by selecting a number of corners 202 from this first subset that satisfy a distance metric defined by the selection algorithm 606. This yields a second, smaller subset of corners 202. The number of corners 202 selected at this step can be a function of the number of unmatched dimensions determined at step 706. For example, if a linear relationship between the target corner 402 and the trained corners 202 is believed to be sufficient to yield an accurate performance prediction for the target corner, the selection algorithm 606 can specify that two trained corners 202 are to be selected for each unmatched dimension identified at step 706. In another example, if an exponential or quadratic relationship is considered necessary, the selection algorithm 606 can specify that three or more trained corners should be selected for each unmatched dimension.

In some embodiments, the number of discrete trained corners 202 selected at step 708 for each dimension can vary per unmatched dimension. This may be the case if some dimensions are known to have a more complicated relationship with the performance metric being predicted than other dimensions, and therefore necessitate selection of more corners 202 in order to yield an accurate performance prediction.

It is to be appreciated that the example selection process depicted in FIG. 7 is only intended to be exemplary, and that any method or criteria for selecting a reduced subset of available trained corners 202 for subsequent estimation of an IC design's performance at a target corner is within the scope of one or more embodiments.

Returning to FIG. 6, once a subset of trained corners 202 has been selected by the corner selection component 106 based on the selection criteria defined by the selection algorithm 606—e.g., using the sequence illustrated in FIG. 7 or another selection methodology—the corner selection component 106 obtains, from the total available corner data 122, reduced corner data 610 corresponding to the selected trained corners 202. This reduced corner data 610 is sent to the target corner prediction component 108 together with the target corner data 602 so that a performance metric prediction can be generated for the target corner 402 based on the selected trained corners 202.

Figure 8:
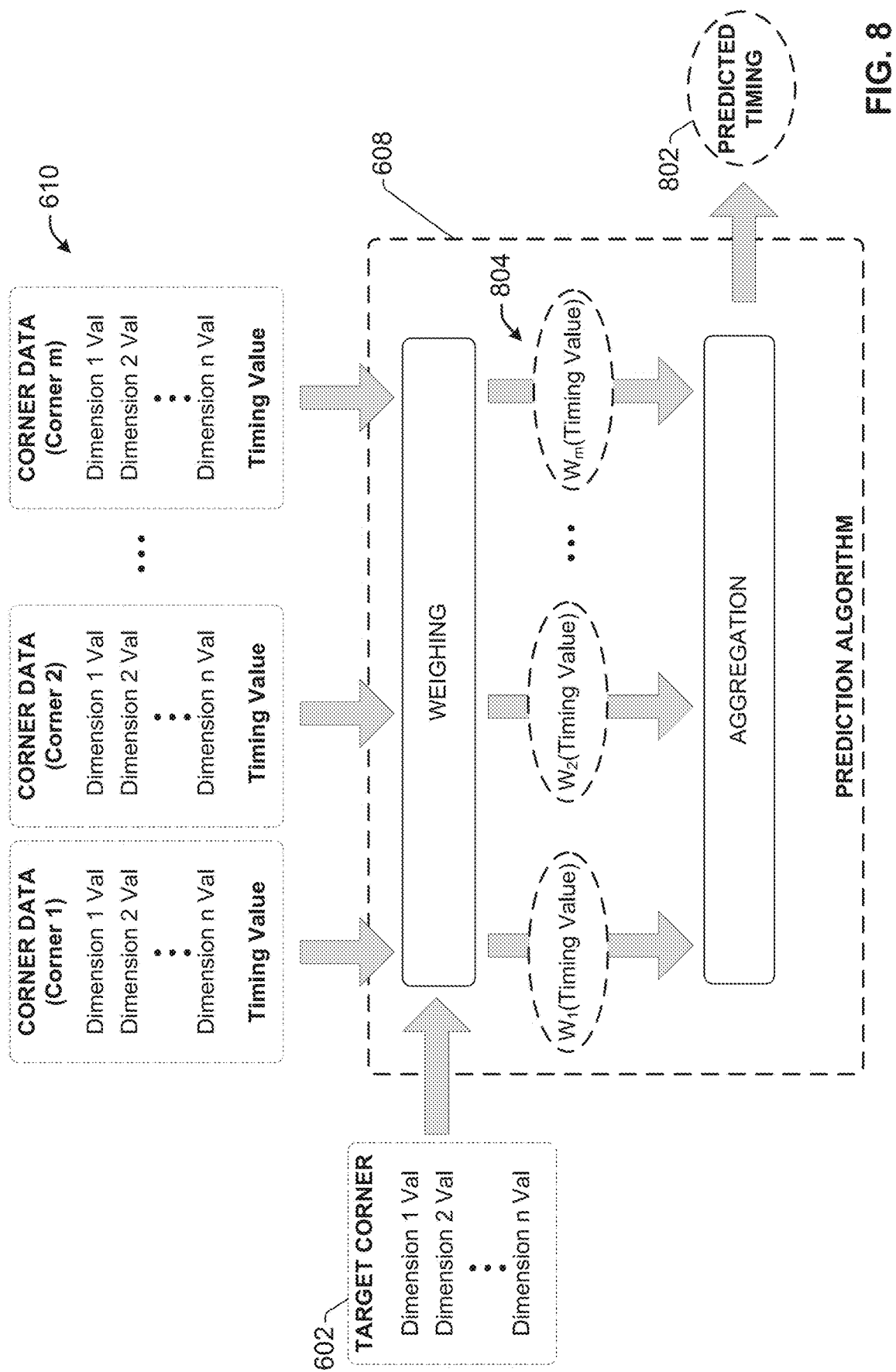
FIG. 8 is a diagram illustrating generation of predicted timing data based on application of a prediction algorithm to reduced corner data and the target corner data.

FIG. 8 is a diagram illustrating generation of predicted timing data 802 based on application of the prediction algorithm 608 to the reduced corner data 610 and the target corner data 602. Although the performance metric in this example is assumed to be circuit timing, the approaches described herein can be used to predict other performance metrics of a circuit design under a given operating condition represented by the target corner 402 (e.g., power consumption). In general, the prediction algorithm 608 aggregates the known timing values associated with the selected trained corners 202 (represented by the reduced corner data 610 for the selected corners 202) based on the distances of the respective trained corners 202 from the target corner 402 in each dimension.

For example, for each of the m discrete trained corners 202 represented by the reduced corner data 610 (where m is an integer representing the number of trained corners 202 selected using methodology 700 or variations thereof), the target corner prediction component 108 can apply a weight or multiplier W to the timing value associated with the trained corner 202 based on the distance of each unmatched dimension of the target corner 202 from the corresponding dimension of the target corner 402. The weight value W applied to the trained corner's timing value can be a function of the distances of each of the trained corner's dimensions from its corresponding dimension of the target corner 402, as represented generally by:

$$W = f(\text{dist}_1, \text{dist}_2, \ldots \text{dist}_n) \tag{1}$$

where W is the weight value applied to the timing value for the trained corner 202, and $\text{dist}_n$ is the distance (or difference) between the trained corner 202 and the target corner 402 in dimension n (e.g., temperature, voltage, etc.). Application of these weights $W_1 \ldots W_m$ to their respective timing values associated with each trained corner 202 yields weighted timing values 804.

Since the performance metric for a given circuit design is likely to be more sensitive to changes in some dimensions than others—e.g., the timing of a circuit may be more sensitive to changes in voltage than temperature—the degree to which each of the $\text{dist}_n$ values affects the weight value W applied to a trained corner's timing value can vary between the n dimensions of the corner. The mathematical relationships between each of the dimension-specific distance values $dist_n$ and the weight value W can be encoded in equation (1) as part of the prediction algorithm 608. In general, equation (1) defines the weight value W as a function of the n distance values corresponding to the respective n dimensions of the corner (where n=4 in the examples described herein).

Once weight values W have been calculated for each of the selected trained corners 202 represented by reduced corner data 610, the prediction algorithm 608 aggregates the resulting weighted timing values 804 associated with each of the selected trained corners 202 to yield a predicted timing value 802 for the target corner 402. The mathematical relationship used to translate the weighted timing values 804 to yield the predicted timing value 802 is also defined by the prediction algorithm 608, and can depend in part on the selection criteria applied at steps 706 and 708 of methodology 700 to select the reduced set of trained corners 202. For example, if the trained corners 202 were selected by the selection algorithm 606 based on an assumption of a linear relationship between the target corner 402 and the trained corners 202, such that only two trained corners 202 were selected for each unmatched dimension, the prediction algorithm 608 can estimate the timing at the target corner 402 based on the presumed linear relationship between the timing at the target corner 402 and the timings at each of the selected trained corners 202. Alternatively, if the selection algorithm 606 had selected the trained corners 202 assuming a more complicated relationship—e.g., an exponential or quadratic relationship requiring more than two trained corners 202 for each unmatched dimension—the prediction algorithm 608 can generate the timing prediction for the target corner 402 based on the type of relationship anticipated during the corner selection steps 706 and 708.

Figure 9:
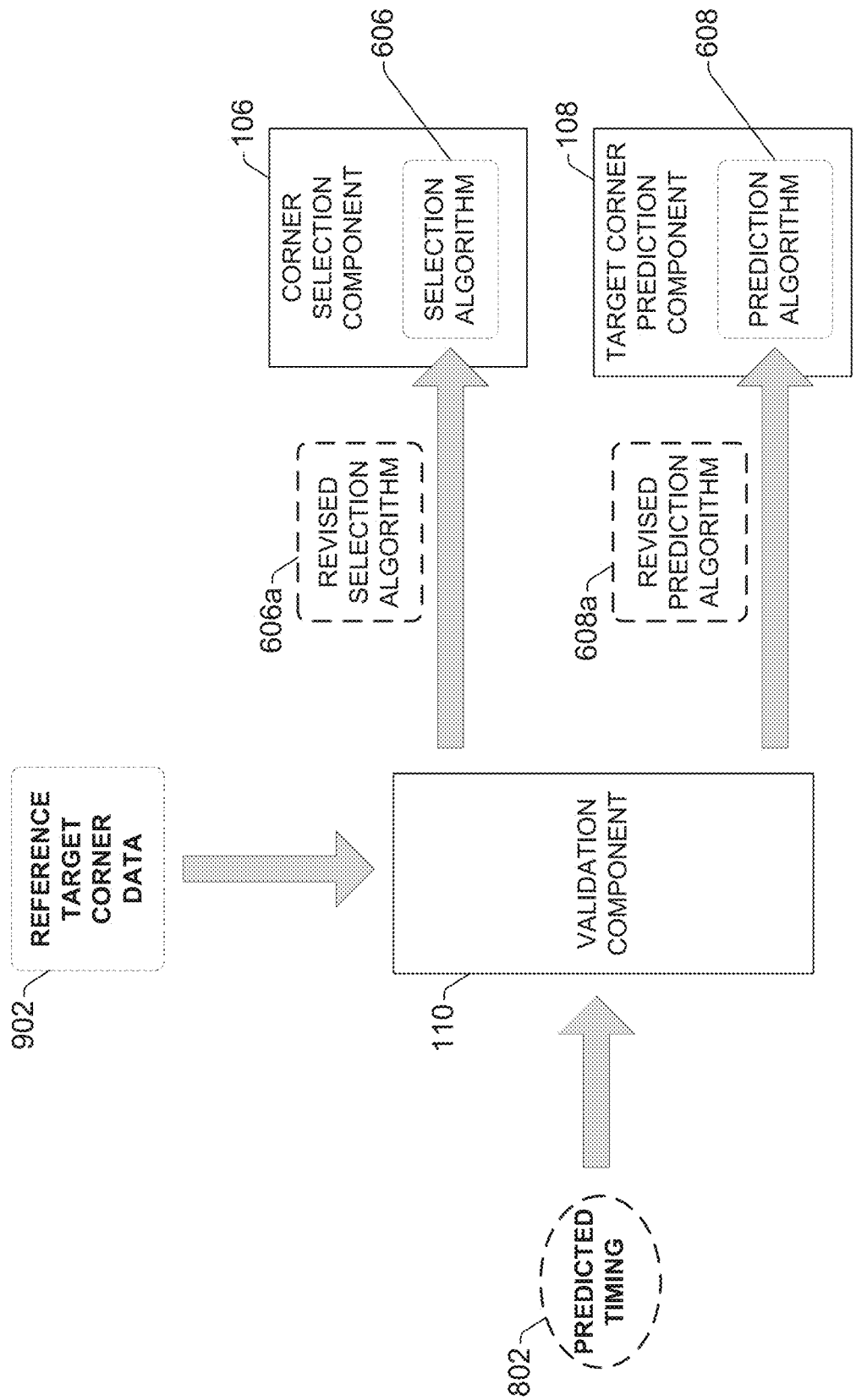
FIG. 9 is a block diagram illustrating validation of a predicted timing value and refinement of selection and prediction algorithms by a corner prediction system.

Once the predicted timing value 802 has been generated, the system 102 can perform the validation phase 504 (see FIG. 5) and refine the selection and prediction algorithms 606 and 608 based on results of the validation. FIG. 9 is a block diagram illustrating validation of the predicted timing value 802 and refinement of the selection and prediction algorithms 606 and 608 by the corner prediction system 102. During this validation step, the validation component 110 of the corner prediction system 102 compares the predicted timing value 802 generated by the target corner prediction component 108 (using prediction algorithm 608) with reference target corner data 902 that defines an actual timing value for the target corner 402. In some scenarios, the reference target corner data 902 may have been generated during development of the IC design being tested.

The validation component 110 is designed to determine an accuracy of the selection algorithm 606 and the prediction algorithm 608 based on a comparison between the predicted timing value 802 obtained by those algorithms and the actual timing value for the circuit under the operating conditions represented by the target corner 402, as represented by the reference target corner data 902. Based on the degree of difference between the predicted timing value 802 and the actual timing value specified by the reference target corner data 902, the validation component 110 modifies one or both of the selection algorithm 606 or the prediction algorithm 608 in a manner intended to bring the predicted timing value 802 in line with the reference target corner data 902, replacing the algorithms 606 and 608 used in the immediately previous regularization phase 502 with revised selection and/or prediction algorithms 606a and 608a. In this way, the validation step optimizes the quality of the algorithms 606 and 608 used during the regularization phase 502.

For example, based on the degree and direction of difference between the predicted timing value 802 and the actual timing value defined in reference target corner data 902, the validation component 110 may modify the selection algorithm 606 (replacing the previous selection algorithm 606 with revised selection algorithm 606a) to change the criteria used at step 704 of methodology 700 to identify the initial subset of trained corners 202, to change the number of trained corners 202 that are selected per unmatched dimension in step 706, or to change the distance metric used at step 708 to select the reduced set of trained corners 202 that are used to generate the predicted timing value 802. In addition, or alternatively, the validation component 110 may modify the prediction algorithm 608 (replacing the previous prediction algorithm 608 with revised prediction algorithm 608a) to change the manner in which weight values W are calculated for each selected corner 202 (e.g., by modifying the mathematical relationship defined by equation (1)) and/or the mathematical relationship between the weighted timing values 804 and the predicted timing value 802 used to translate the weighted timing values 804 into the predicted timing value 802.

In an example scenario, the initial regularization phase 502 may be executed assuming that a linear relationship is sufficient for characterizing the target corner 402 relative to the selected trained corners 202, and as such the selection algorithm 606 may have selected a number of trained corners 202 at step 706 of methodology 700 equivalent to two corners 202 per unmatched dimension. If the validation component 110 determines, based on the result of the comparison between the predicted timing value 802 and the actual timing value, that the linear relationship is not sufficient to accurately characterize the target corner 402 relative to the selected trained corners 202, the validation component 110 may update the algorithms 606 and 608 to assume an exponential relationship. This can involve modifying the selection algorithm 606 to select a greater number of trained corners 202 at step 708, and modifying the prediction algorithm 608 to use an exponential mathematical relationship between the target corner 402 and the selected trained corners 202 to generate the predicted timing value 802.

In some scenarios, the modifications made to the selection algorithm 606 or the prediction algorithm 608 may be dimension-specific. For example, depending on the degree and direction of the difference between the predicted timing value 802 and the reference timing value, the validation component 110 may change equation (1) to modify the degree to which one of the dimensions affects the weight value W applied to a trained corner's timing value. Similarly, the validation component 110 may modify the prediction algorithm 608 to change the degree to which the distance of one of the dimensions of the trained corners 202 from its corresponding dimension of the target corner 402 affects the calculation of the predicted timing value 802.

Once the validation component 110 has updated the selection and/or prediction algorithms 606 based on the deviation of the predicted timing value 802 from the actual timing value, the corner prediction system 102 can re-execute the regularization phase 502 and validation phase 504 using the updated algorithms 606a and 608a, and perform additional refinement of the algorithms 606 and/or 608 if necessary based on the new results. As illustrated by the feedback loop depicted in FIG. 5, the regularization and validation phases 502 and 504 can be repeated until the predicted timing value 802 accords with the reference target corner data 902 (e.g., when the validation component 110 determines that the predicted timing value 802 satisfies a similarity criterion relative to the actual timing value indicated by the reference target corner data 902). At that time, the selection and prediction algorithms 606 and 608 are assumed to be optimized, and can be used to generate accurate timing predictions for substantially any target corner 402 located within a continuous space between the trained corners 202.

Figure 10:
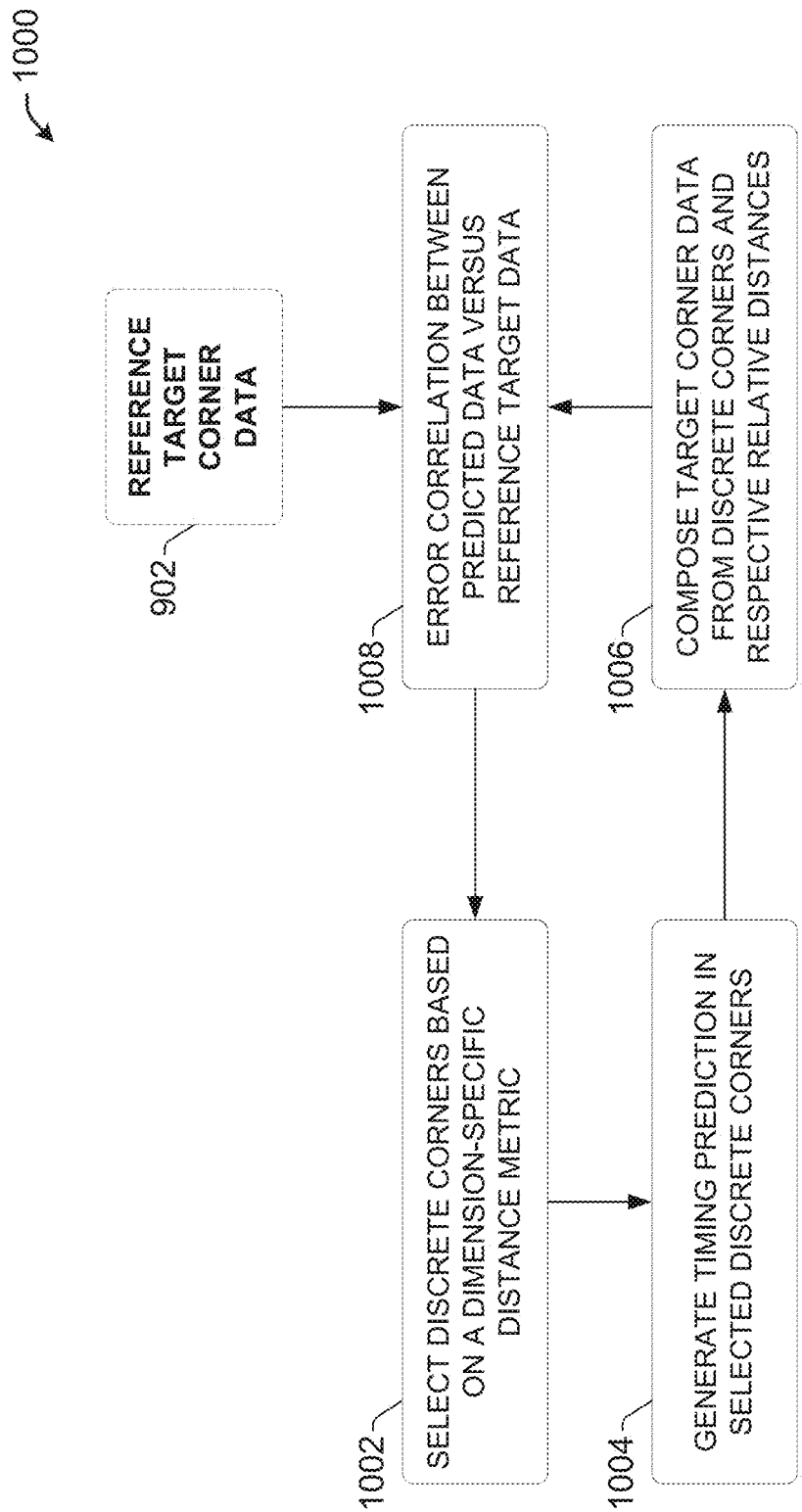
FIG. 10 is a flowchart that illustrates a feedback loop for optimizing selection and prediction algorithms.

FIG. 10 is a flowchart 1000 that illustrates this feedback loop. At step 1002, trained corners 202 are selected based on a dimension-specific distance metric (e.g., using methodology 700 discussed above in connection with FIG. 7). At step 1004, timing predictions are generated or obtained in the selected trained corners 202 (e.g., as represented by the selected corner data 610 illustrated in FIG. 6 and FIG. 8). At 1006, predicted timing data for the target corner is composed based on the timings associated with the selected trained corners and the relative dimension-specific distances of the respective trained corners relative to the target corner. At 1008, an error correlation is determined between the predicted timing data and the reference target data, and this result is used to refine the corner selection process of step 1002 (e.g., by modifying the distance metric used to select the corners). The results of step 1008 can also be used to refine the method used to compose the target corner timing at step 1004.

By iteratively executing the regularization phase 502 and validation phase 504 described herein, the corner prediction system 102 can use prediction results of a given target corner to refine and generalize the selection and prediction algorithms 606 and 608 used by the system 102 to generate timing predictions, yielding algorithms 606 and 608 that can be used to generate accurate timing predictions for the IC design at any target corner 402 within the continuous space between trained corners 202. The resulting selection and prediction algorithms 606 and 608 can be scaled across a continuous range of operational conditions, rather than being limited to a discrete set of target corners.

Figure 11A:
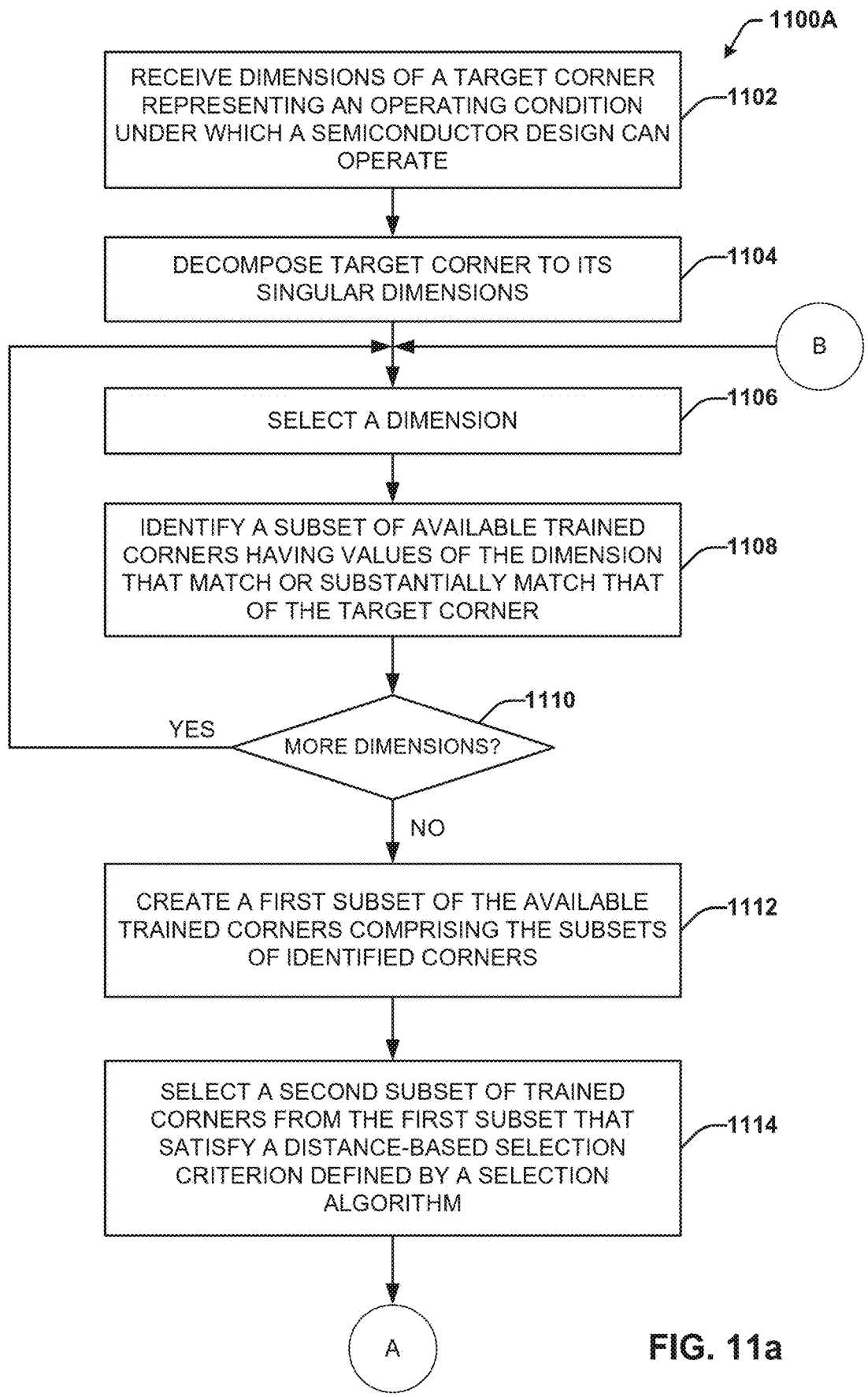
FIG. 11a illustrates a first part of a flow diagram of an example, non-limiting embodiment of a method for optimizing a corner prediction system to accurately predict a performance of a semiconductor design under a continuous range of operating conditions.
Figure 11B:
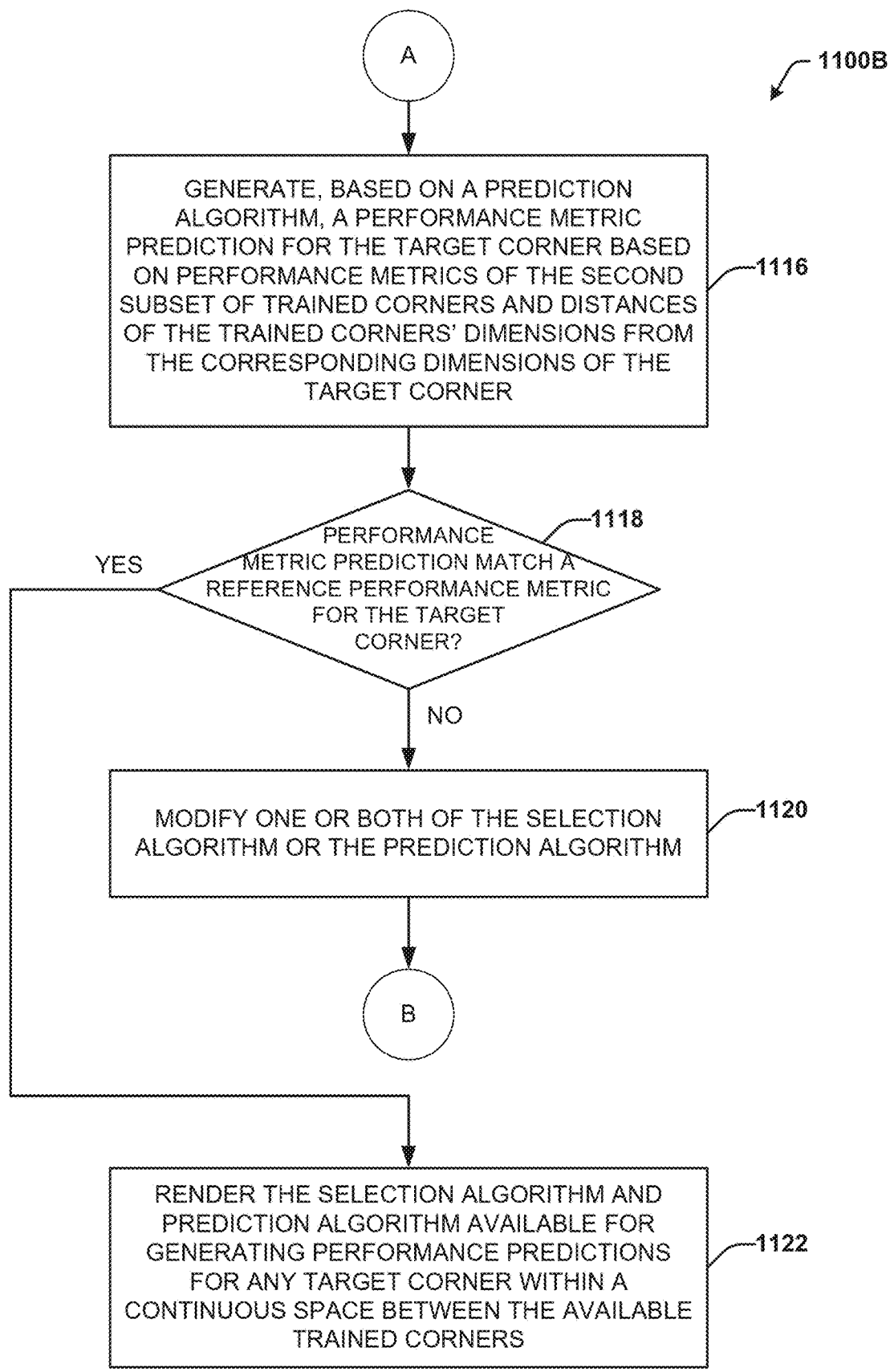
FIG. 11b illustrates a second part of the flow diagram of the example, non-limiting embodiment of a method for optimizing a corner prediction system to accurately predict a performance of a semiconductor design under a continuous range of operating conditions.

In view of the example systems described above, methods that may be implemented in accordance with the described subject matter may be better appreciated with reference to the flowcharts of FIGS. 11a-11b. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. The methods described below can be implemented using hardware, software, or a combination of hardware and software implemented as on-board components of a memory architecture.

FIG. 11a is a flow diagram of a first part of an example, non-limiting methodology 1100A for optimizing a corner prediction system to accurately predict a performance of a semiconductor design under a continuous range of operating conditions. Methodology 1100A begins at step 1102, where dimensions of a target corner representing an operating condition under which a semiconductor design can operate are received. In an example scenario, the target corner may define values of four dimensions comprising device process, interconnect process, supply voltage, and pressure, which collectively represent an operating condition under which the semiconductor design may operate. At 1104, the target corner received at step 1102 is decomposed into its singular dimensions so that dimension-specific comparisons can be made with available discrete trained corners.

At 1106, one of the dimensions of the target corner is selected. At 1108, a subset of available trained corners having values of the selected dimension that match or substantially match that of the target corner are selected.

At 1110, a determination is made as to whether there are additional dimensions for which step 1108 have not been performed. If there are additional dimensions that have not yet been compared (YES at step 1110), the methodology returns to step 1106, where a different dimension is selected and another subset of the available trained corners having values of the dimension that match or substantially match that of the target corner is selected. Steps 1106-1110 are repeated until step 1108 has been performed for all dimensions of the target corner.

When there are no more dimensions to compare (NO at step 1110), the methodology proceeds to step 1112, where a first subset of the available trained corners comprising the subsets identified by the iterations of step 1108 is created. At 1114, a second subset of trained corners is selected from this first subset. The second subset of the trained corners are those that satisfy a distance-based selection criterion defined by a selection algorithm. In some embodiments, the selection algorithm can define a number of trained corners that are to be selected for the second subset (e.g., a specified number of trained corners per unmatched dimensions), and can also define the distance-based selection criterion used to select these corners. In an example scenario, the selection algorithm can specify that corners of the first subset having the largest number of dimensions whose values match those of the corresponding dimensions of the target corner are to be selected for inclusion in the second subset, and can also define a distance criterion for further selecting from this reduced set based on distances of the unmatched dimensions from the target corner. These example selection criteria are only intended to be exemplary, and it is to be appreciated that any suitable criteria for selecting a reduced second subset of trained corners from a larger set of available trained corners based on distance from or similarity to a target corner are within the scope of one or more embodiments.

When the second subset of trained corners has been selected, the methodology proceeds to the second part 1100B illustrated in FIG. 11b. At 1116, based on a prediction algorithm, a performance metric prediction is generated for the target corner based on known performance metrics associated with the respective corners of the second subset of trained corners, as well as distances of those trained corners' dimensions from the corresponding dimensions of the target corner. The prediction algorithm can use any suitable mathematical relationship between the trained corners and the target corner to translate the trained corners' known performance metrics to a predicted performance metric for the target corner, including but not limited to a linear relationship, an exponential relationship, a quadratic relationship, etc. In some embodiments, the selection criterion used at step 1114 to select the second subset of trained corners can be based in part on the mathematical relationship that will be used by the prediction algorithm to perform this translation at step 1116, such that the two algorithms coordinate to generate a predicted performance metric according to an agreed mathematical relationship. For example, the selection criterion may select two corners for each unmatched dimension at step 1114 if a linear mathematical relationship will be applied by the prediction algorithm at step 1116, or may select more than two corners for each unmatched dimension at step 1114 if a more complicated mathematical relationship will be applied by the prediction algorithm at step 1116.

At 1118, a determination is made as to whether the performance metric prediction generated at step 1116 matches a reference performance metric for the target corner. The reference performance metric may be an actual value of the performance metric obtained during design or testing of the semiconductor circuit under conditions represented by the target corner, or may otherwise be a presumed actual value of the performance metric for the target corner obtained by other means (e.g., by simulating the design on another simulation platform). The performance metric prediction can be determined to match the reference performance metric if the predicted metric satisfies a similarity criterion relative to the reference metric (e.g., if the predicted metric is within a defined tolerance of the reference metric). If the performance metric prediction does not match the reference performance metric for the target corner (NO at step 1118), the methodology proceeds to step 1120, where one or both of the selection algorithm used at step 1114 or the prediction algorithm used at step 1116 are modified based on the degree of difference between the predicted performance metric and the reference performance metric. The methodology then returns to step 1106, and steps 1106-1118 are repeated using the modified algorithm(s).

Steps 1106-1120 are repeated until the predicted performance metric is determined to match the reference performance metric (YES at step 1118), at which time the methodology proceeds to step 1122, where the selection algorithm and prediction algorithm as modified by the most recent execution of step 1120 are rendered available for generating performance predictions for any target corner within a continuous space between the available trained corners.

Example Computing Environment

Figure 12:
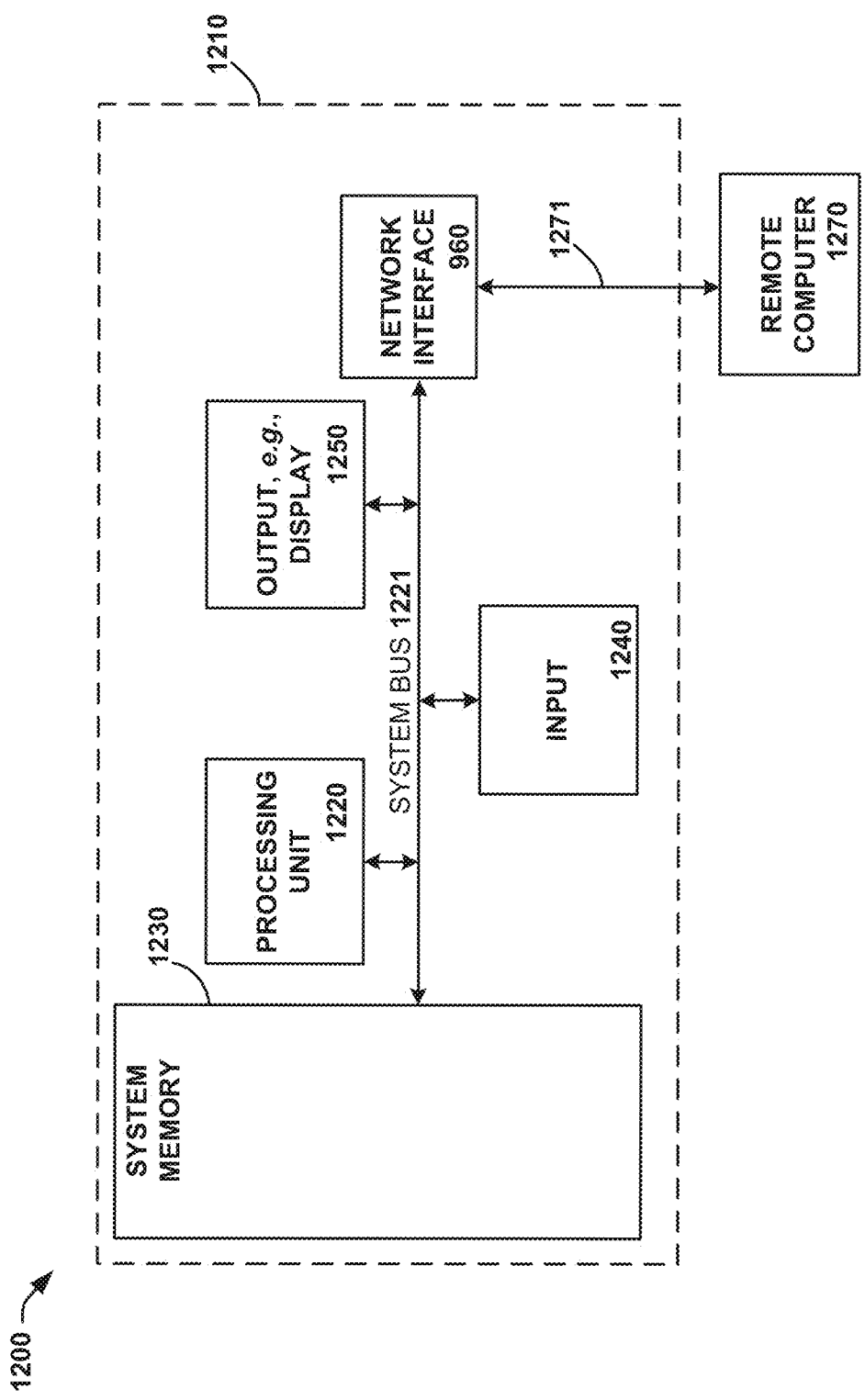
FIG. 12 illustrates a block diagram of an example electronic computing environment that can be implemented in conjunction with one or more aspects described herein.

The techniques described herein can be applied to any computing system intended to be used to design, test, or simulate an integrated circuit design. It is to be understood, therefore, that computing devices and computing objects of all kinds are contemplated for use in connection with the various non-limiting embodiments. Accordingly, the below general purpose remote computer described below in FIG. 12 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 12 thus illustrates an example of a suitable computing system environment 1200 in which some aspects of the disclosed subject matter can be implemented, although as made clear above, the computing system environment 1200 is only one example of a suitable computing environment for a device and is not intended to suggest any limitation as to the scope of use or functionality of the disclosed subject matter. Neither should the computing system environment 1200 be interpreted as having any dependency or requirement relating to any one or combination of components illustrated in the exemplary computing system environment 1200.

With reference to FIG. 12, an exemplary device for implementing the disclosed subject matter includes a general-purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules, or other data in a modulated data signal such as a carrier wave or other transport mechanism and includes any information delivery media.

The system memory 1230 may include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, may be stored in memory 1230. Memory 1230 typically also contains data and/or program modules that are immediately accessible to and/or presently being operated on by processing unit 1220. By way of example, and not limitation, memory 1230 may also include an operating system, application programs, other program modules, and program data.

The computer 1210 may also include other removable/non-removable, volatile/nonvolatile computer storage media. For example, computer 1210 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1221 through a non-removable memory interface such as an interface, and a magnetic disk drive or optical disk drive is typically connected to the system bus 1221 by a removable memory interface, such as an interface.

A user can enter commands and information into the computer 1210 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1220 through user input 1240 and associated interface(s) that are coupled to the system bus 1221, but may be connected by other interface and bus structures, such as a parallel port, game port, or a universal serial bus (USB). A graphics subsystem can also be connected to the system bus 1221. A projection unit in a projection display device, or a HUD in a viewing device or other type of display device can also be connected to the system bus 1221 via an interface, such as output interface 1250, which may in turn communicate with video memory. In addition to a monitor, computers can also include other peripheral output devices such as speakers which can be connected through output interface 1250.

The computer 1210 can operate in a networked or distributed environment using logical connections to one or more other remote computer(s), such as remote computer 1270, which can in turn have media capabilities different from computer 1210. The remote computer 1270 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1210. The logical connections depicted in FIG. 12 include a network 1271, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1210 can be connected to the network 1271 through a network interface or adapter. When used in a WAN networking environment, the computer 1210 can typically include a communications component, such as a modem, or other means for establishing communications over the WAN, such as the Internet. A communications component, such as wireless communications component, a modem and so on, which can be internal or external, can be connected to the system bus 1221 via the user input interface of input 1240, or other appropriate mechanism. In a networked environment, program modules depicted relative to the computer 1210, or portions thereof, can be stored in a remote memory storage device. It will be appreciated that the network connections shown and described are exemplary and other means of establishing a communications link between the computers can be used.

Example Networking Environment

Figure 13:
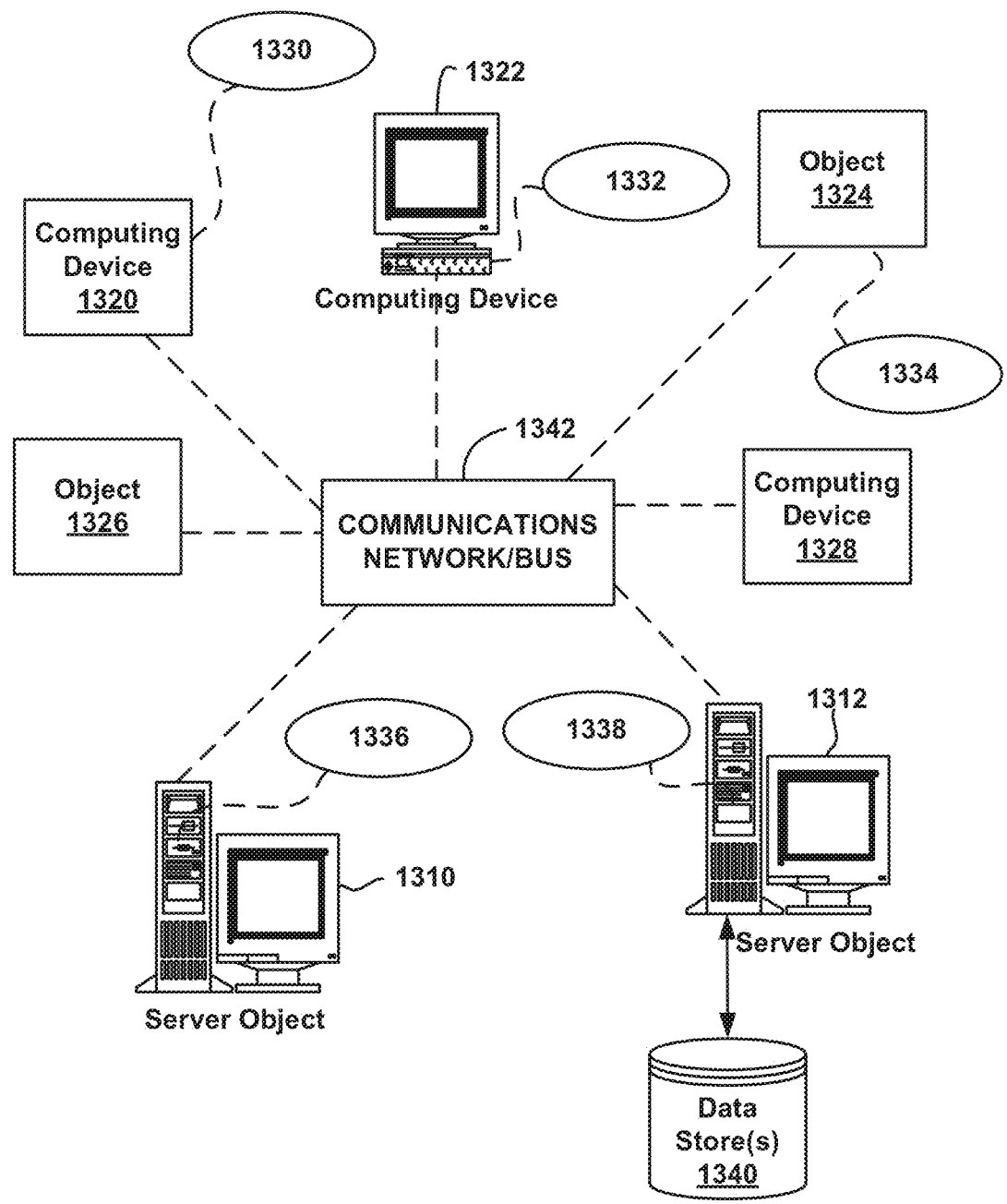
FIG. 13 illustrates a block diagram of an example data communication network that can be operable in conjunction with various aspects described herein.

FIG. 13 provides a schematic diagram of an exemplary networked or distributed computing environment. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338 and data store(s) 1340. It can be appreciated that computing objects 1310, 1312, etc. and computing objects or devices 1320, 1322, 1324, 1326, 1328, etc. may comprise different devices, including a multimedia display device or similar devices depicted within the illustrations, or other devices such as a mobile phone, personal digital assistant (PDA), audio/video device, MP3 players, personal computer, laptop, etc.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1342, either directly or indirectly. Even though illustrated as a single element in FIG. 13, communications network 1342 may comprise other computing objects and computing devices that provide services to the system of FIG. 13, and/or may represent multiple interconnected networks, which are not shown. Each computing object 1310, 1312, etc. or computing object or devices 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc., acting as servers provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1342 or bus is the Internet, for example, the computing objects 1310, 1312, etc. can be Web servers with which other computing objects or devices 1320, 1322, 1324, 1326, 1328, etc. communicate via any of a number of known protocols, such as the hypertext transfer protocol (HTTP). Computing objects 1310, 1312, etc. acting as servers may also serve as clients, e.g., computing objects or devices 1320, 1322, 1324, 1326, 1328, etc., as may be characteristic of a distributed computing environment Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for predicting performance of an integrated circuit, comprising:
    a memory that stores executable components and trained corner data defining performance metric values for an integrated circuit design under respective different operating conditions corresponding to discrete process, voltage, and temperature (PVT) corners; and
    a processor, operatively coupled to the memory, that executes the executable components, the executable components comprising:
        a corner selection component configured to select a subset of the discrete PVT corners that satisfy a distance-based selection criterion relative to a target corner representing a target operating condition, wherein the distance-based selection criterion is defined by a selection algorithm;
        a target corner prediction component configured to generate, based on a prediction algorithm, a predicted performance metric value for the integrated circuit design under the target operating condition based on respective distances of the subset of the discrete PVT corners from the target corner and a subset of the performance metric values associated with the subset of the discrete PVT corners; and
        a validation component configured to modify at least one of the selection algorithm or the prediction algorithm based on a difference between the predicted performance metric value and a reference performance metric value for the target corner to yield modified algorithms, wherein
    the discrete PVT corners and the target corner are characterized by multiple dimensions, and
    the corner selection component is configured to:
        identify a first subset of the discrete PVT corners determined to match the target corner in at least one of the multiple dimensions, and
        select, as the subset of the discrete PVT corners, a second subset selected from the first subset of the discrete PVT corners whose unmatched dimensions satisfy a distance criterion relative to the target corner, wherein the distance criterion is defined by the selection algorithm.

2. The system of claim 1, wherein a number of the discrete PVT corners selected by the corner selection component for inclusion in the subset of the discrete PVT corners is based on a number of the multiple dimensions that do not match between the target corner and the first subset of the discrete PVT corners.

3. The system of claim 2, wherein the validation component is configured to change the number of the discrete PVT corners selected by the corner selected component for inclusion in the subset of the discrete PVT corners based on the difference between the predicted performance metric value and the reference performance metric value for the target corner.

4. The system of claim 1, wherein the validation component is configured to modify the distance criterion based on the difference between the predicted performance metric value and the reference performance metric value for the target corner.

5. The system of claim 1, wherein the target corner prediction component is configured to:
    apply weight values to the performance metric values associated with the subset of the discrete PVT corners based on distances of one or more dimensions of the subset of the discrete PVT corners from corresponding one or more dimensions of the target corner to yield weighted performance metric values, and
    aggregate the weighted performance metric values to yield the predicted performance metric value.

6. The system of claim 5, wherein
    the prediction algorithm defines first mathematical relationships for calculating the weight values as a function of the distances of the one or more dimensions of the subset of the discrete PVT corners from corresponding one or more dimensions of the target corner,
    the prediction algorithm defines second mathematical relationships for translating the weighted performance metric values to the predicted performance metric values, and
    the validation component is configured to modify at least one of the first mathematical relationships or the second mathematical relationships based on the difference between the predicted performance metric value and the reference performance metric value for the target corner.

7. The system of claim 1, wherein the predicted performance metric value is a predicted value of at least one of a circuit timing or a power consumption of the integrated circuit design.

8. The system of claim 1, wherein the corner selection component and the target corner prediction component are configured to use the modified algorithms to generate another predicted performance metric value for another target corner within a continuous space between the discrete PVT corners.

9. A method for predicting a performance metric of an integrated circuit, comprising:
identifying, by a system comprising a processor, a subset of trained process, temperature, and voltage (PVT) corners whose dimensional distances from a target corner satisfy a defined selection criterion, wherein the target corner represents a target operating condition for an integrated circuit;
generating, by the system based on a prediction algorithm, a predicted performance metric value for the integrated circuit under the target operating condition based on respective dimensional distances of the subset of the trained PVT corners from the target corner and performance metric values associated with the subset of the trained PVT corners; and
modifying, by the system based on a difference between the predicted performance metric value and a reference performance metric value for the target corner, at least one of the defined selection criterion or the prediction algorithm, wherein
the trained PVT corners and the target corner are characterized by multiple dimensions, and
the identifying comprises:
identifying a first subset of the trained PVT corners determined to match the target corner in at least one of the multiple dimensions, and
selecting, as the subset of the trained PVT corners, a second subset selected from the first subset of the trained PVT corners whose unmatched dimensions satisfy a distance criterion relative to the target corner.

10. The method of claim 9, wherein the identifying comprises selecting a number of the trained PVT corners for inclusion in the subset of the trained PVT corners is based on a number of the multiple dimensions that do not match between the target corner and the first subset of the trained PVT corners.

11. The method of claim 10, wherein the modifying comprises changing the number of the trained PVT corners to be included in the subset of the trained PVT corners based on the difference between the predicted performance metric value and the reference performance metric value for the target corner.

12. The method of claim 9, wherein the modifying comprises modifying the distance criterion based on the difference between the predicted performance metric value and the reference performance metric value for the target corner.

13. The method of claim 9, wherein the generating comprises:
applying weight values to the performance metric values associated with the subset of the trained PVT corners based on distances of one or more dimensions of the subset of the trained PVT corners from corresponding one or more dimensions of the target corner to yield weighted performance metric values, and
aggregating the weighted performance metric values to yield the predicted performance metric value.

14. The method of claim 13, wherein
the prediction algorithm defines first mathematical relationships for calculating the weight values as a function of the distances of the one or more dimensions of the subset of the trained PVT corners from corresponding one or more dimensions of the target corner,
the prediction algorithm further defines second mathematical relationships that translate the weighted performance metric values to the predicted performance metric values, and
the modifying comprises modifying at least one of the first mathematical relationships or the second mathematical relationships based on the difference between the predicted performance metric value and the reference performance metric value for the target corner.

15. The method of claim 9, wherein the predicted performance metric value is a predicted value of at least one of a circuit timing or a power consumption of the IC design.

16. The method of claim 9, further comprising applying the defined selection criterion or the prediction algorithm subsequent to the modifying to generate another predicted performance metric value for another target corner within a continuous space between the trained PVT corners.

17. A non-transitory computer-readable medium having stored thereon instructions that, in response to execution, cause a system comprising a processor to perform operations, the operations comprising:
selecting a subset of trained process, temperature, and voltage (PVT) corners that satisfy a distance-based selection criterion relative to a target corner representing a target operating condition for an integrated circuit, wherein the distance-based selection criterion is defined by a selection algorithm;
generating, based on a prediction algorithm, a predicted performance metric value for the integrated circuit under the target operating condition based on respective dimensional distances of the subset of the trained PVT corners from the target corner and performance metric values associated with the subset of the trained PVT corners; and
modifying, based on a difference between the predicted performance metric value and a reference performance metric value for the target corner, at least one of the selection algorithm or the prediction algorithm, wherein
the trained PVT corners and the target corner are characterized by multiple dimensions, and
the selecting comprises:
identifying a first subset of the trained PVT corners determined to match the target corner in at least one of the multiple dimensions, and
selecting, as the subset of the trained PVT corners, a second subset selected from the first subset of the trained PVT corners whose unmatched dimensions satisfy a distance criterion relative to the target corner.

18. A system for predicting performance of an integrated circuit, comprising:
a memory that stores executable components and trained corner data defining performance metric values for an integrated circuit design under respective different operating conditions corresponding to discrete process, voltage, and temperature (PVT) corners; and
a processor, operatively coupled to the memory, that executes the executable components, the executable components comprising:
a corner selection component configured to select a subset of the discrete PVT corners that satisfy a distance-based selection criterion relative to a target corner representing a target operating condition, wherein the distance-based selection criterion is defined by a selection algorithm;

a target corner prediction component configured to generate, based on a prediction algorithm, a predicted performance metric value for the integrated circuit design under the target operating condition based on respective distances of the subset of the discrete PVT corners from the target corner and a subset of the performance metric values associated with the subset of the discrete PVT corners; and a validation component configured to modify at least one of the selection algorithm or the prediction algorithm based on a difference between the predicted performance metric value and a reference performance metric value for the target corner to yield modified algorithms, wherein the target corner prediction component is configured to:
apply weight values to the performance metric values associated with the subset of the discrete PVT corners based on distances of one or more dimensions of the subset of the discrete PVT corners from corresponding one or more dimensions of the target corner to yield weighted performance metric values, and aggregate the weighted performance metric values to yield the predicted performance metric value, the prediction algorithm defines first mathematical relationships for calculating the weight values as a function of the distances of the one or more dimensions of the subset of the discrete PVT corners from corresponding one or more dimensions of the target corner, the prediction algorithm defines second mathematical relationships for translating the weighted performance metric values to the predicted performance metric values, and the validation component is configured to modify at least one of the first mathematical relationships or the second mathematical relationships based on the difference between the predicted performance metric value and the reference performance metric value for the target corner.

19. The system of claim 18, wherein the predicted performance metric value is a predicted value of at least one of a circuit timing or a power consumption of the integrated circuit design.

20. The system of claim 18, wherein the corner selection component and the target corner prediction component are configured to use the modified algorithms to generate another predicted performance metric value for another target corner within a continuous space between the discrete PVT corners.

* * * * *